United States Patent
Schulte

[19]

[11] Patent Number: 6,019,934
[45] Date of Patent: Feb. 1, 2000

[54] HOLLOW EXTRUSION USING INTERNAL COOLANT

[75] Inventor: Ulrich Schulte, Kelkheim, Germany

[73] Assignee: Hoechst Aktiengesellschaft, Germany

[21] Appl. No.: 08/795,278

[22] Filed: Feb. 4, 1997

[30] Foreign Application Priority Data

Feb. 6, 1996 [DE] Germany ............................ 196 04 196

[51] Int. Cl.[7] .................................................. B29C 47/78
[52] U.S. Cl. ........................ 264/558; 264/560; 264/150; 264/209.1; 264/237; 425/71
[58] Field of Search ..................................... 264/150, 557, 264/558, 560, 237, 209.1; 425/71, 72.1, 326.1

[56] References Cited

U.S. PATENT DOCUMENTS

| | | | |
|---|---|---|---|
| 3,784,345 | 1/1974 | Wissinger et al. .................... | 425/325 |
| 4,088,724 | 5/1978 | Kuhnert .................................. | 264/85 |
| 4,750,873 | 6/1988 | Loe et al. ............................... | 425/71 |
| 4,867,669 | 9/1989 | Da Silva et al. ..................... | 425/326.1 |
| 5,261,988 | 11/1993 | Dikis et al. ......................... | 156/244.13 |
| 5,422,063 | 6/1995 | Pelzer ................................... | 264/209.1 |

FOREIGN PATENT DOCUMENTS

| | | |
|---|---|---|
| 32 16 720 | 11/1983 | Germany. |
| WO 94 05482 | 3/1994 | WIPO. |
| WO 95/30533 | 11/1995 | WIPO. |
| WO 96 23644 | 8/1996 | WIPO. |
| WO 96 34733 | 11/1996 | WIPO. |

*Primary Examiner*—Jan H. Silbaugh
*Assistant Examiner*—Mark Eashoo
*Attorney, Agent, or Firm*—Connolly Bove Lodge & Hutz

[57] ABSTRACT

The process according to the invention for producing large-bore thick-walled pipes made of polyethylene comprises extruding the polymer composition out of an annular die 3 and subsequently cooling the melt 7 emerging from the die 3 using water as the coolant from the outside, the melt 7 emerging from the die being additionally also cooled with water from the inside. In order to ensure the internal cooling, according to the invention floating plugs 11 and 12 are inserted, which plugs are fixed in their physical position relative to the extrusion die 3 by means of retaining elements.

5 Claims, 1 Drawing Sheet

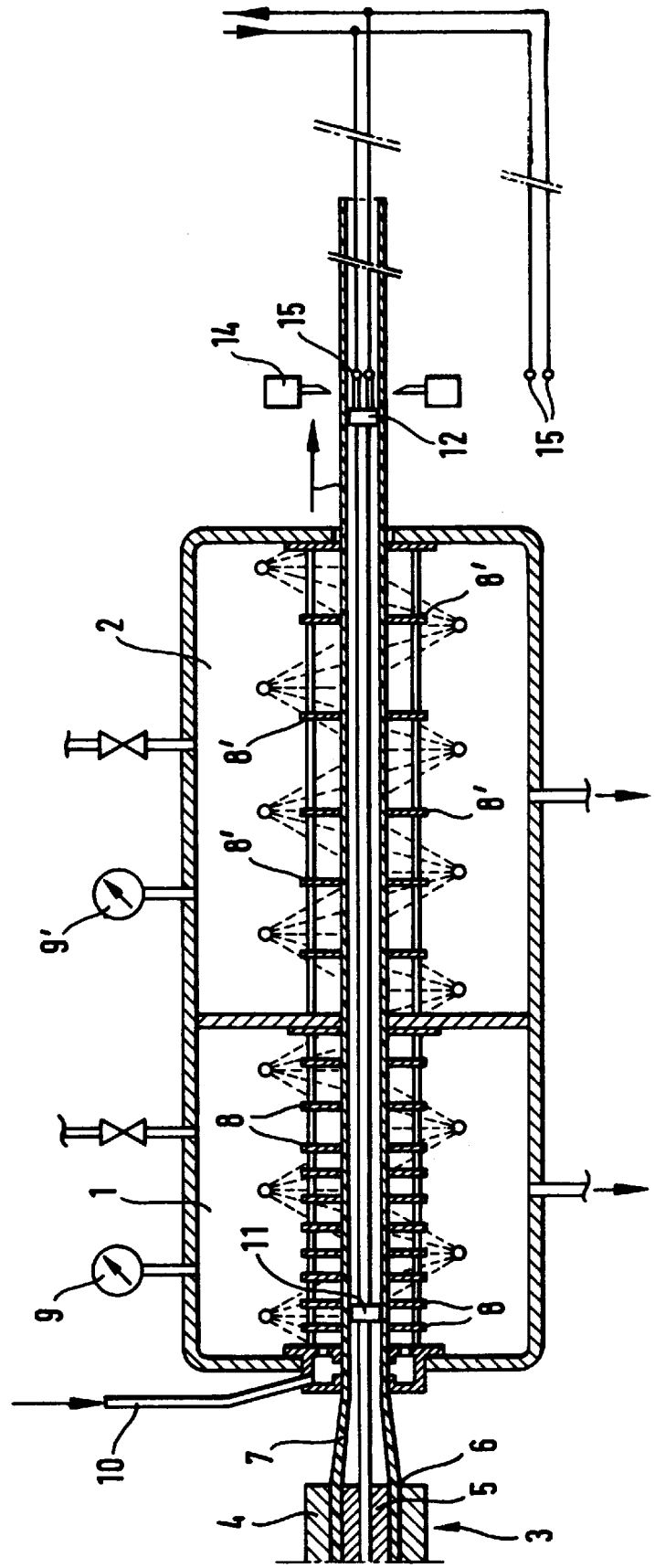

HOLLOW EXTRUSION USING INTERNAL COOLANT

The present invention relates to an improved process for producing large-bore thick-walled pipes made of polyethylene by extrusion from an annular die and subsequent cooling of the melt emerging from the die, using water as the coolant from the outside, in which it is not possible for undesired deformations to occur after the melt emerges from the die as a result of the melt flowing due to gravity.

Pipes made of thermoplastic are usually produced by the extrusion technique. In this technique, the thermoplastic material is plasticized in an extruder, is pressed out through a die in the molten liquid state and is subsequently cooled from the outside, with the aid of water as a coolant. In the process, the melt is normally pressed out in the horizontal direction. However, particularly thick-walled and large-bore pipes are continually subjected to the drawback that the melt does not cool sufficiently quickly, as a result of which parts of the plastic melt flow downward, in accordance with the law of gravity, and thus lead to significant nonuniformities of the wall thickness, which mean that the finished pipe is no longer usable for its intended application.

The object of the invention was to develop an improved extrusion process in which the formation of nonuniformities of wall thickness is effectively suppressed.

This object is achieved by means of a process of the generic type cited at the outset, the characterizing feature of which is to be regarded as the fact that the melt emerging from the die is also additionally cooled with water from the inside.

In the context of the present invention, the attributes "large-bore" and "thick-walled" are to be understood such that pipes having an external diameter in the range from 300 to 1800 mm, in particular from 400 to 1600 mm, and having a wall thickness in the range from 25 to 80 mm, preferably from 30 to 60 mm, meet the conditions of these features.

In order to prevent the cooling water from flowing out of the interior of the pipe, two floating plugs are expediently inserted. In the context of the present invention, floating plugs are to be understood as meaning disklike sealing elements, the external diameter of which precisely corresponds to the internal diameter of the plastic pipe to be produced. According to the invention, the floating plugs are fixed on the extrusion die in their physical position relative to the extrusion die by means of retaining elements.

Water is introduced into the space between the two floating plugs in an amount which fills the volume of the space with water to a level of 0.1 to 40%, preferably to a level of 0.2 to 30%, particularly preferably to a level of 0.3 to 25%.

According to the invention, the first floating plug is arranged at only a short distance from the location where the melt emerges, a short distance being understood as a distance in the range from 20 to 80 cm, preferably from 30 to 70 cm. According to the invention, the second floating plug is arranged at a greater distance from the location where the melt emerges and near to the cutting-to-length tool at which the pipe, which initially emerges from the die in an endless manner, is severed into individual sections, the term "near to" being understood to mean a distance in the range from 20 to 50 cm, preferably from 25 to 40 cm. The second floating plug is provided with suitable quick closures, by means of which the supply and discharge of the cooling water can be effected. Expediently, a plurality of sets of water supply and discharge lines are present, the currently active set of supply and discharge lines being detached and replaced by a subsequent set of supply and discharge lines, which is already prepared, in each case after a pipe section has been severed.

The internal cooling according to the invention utilizes in particular the heat of evaporation of the water. In the extrusion process, the melt emerges from the die at a temperature in the range from 170 to 250° C. This temperature must be cooled to a temperature of at most 100° C. as quickly as possible. A natural flow of water is formed in the internal cooling. The cooling water entering through the second floating plug, which is remote from the die, runs inside the pipe towards the first floating plug, which is near to the die, and evaporates as a result of the high temperature of the plastic melt. In the process, the heat of evaporation is removed from the melt and the latter cools to a temperature of about 100° C. The steam formed then flows back again, under a slight excess pressure, towards the second floating plug, which is remote from the die, and on the way there condenses again. The amount of heat to be removed depends on the overall throughput of plastic and can be calculated. Accordingly, a corresponding amount of heated water has to be removed at the second floating plug, which is remote from the die, and replaced by new cooling water.

Preferably, in addition to the quick closures, which are preferably designed as bayonet closures, an excess pressure safety valve is additionally installed on the second floating plug, which is remote from the die. It has been shown that the evaporating water produces a slight excess pressure in the pipe interior, which excess pressure additionally counteracts deformation of the walls.

The present invention will be explained in more detail by way of example for those skilled in the art by means of the appended drawing.

The drawing diagrammatically shows a vertical section through a cooling system for plastic pipes.

Reference numerals indicate, in particular, a first vacuum container 1 and a second container 2. In the illustration, the extrusion die 3 comprises a die ring 4, a mandrel 5 and a sizing sleeve 6. The melt 7 emerging from the die 3 enters the first vacuum container 1 and is immediately subjected to cooling water from the outside via a water supply line 10. Sizing plates 8, by means of which the melt 7 is supported from the outside, are situated in the interior of the vacuum container 1, the reduced pressure of which is displayed on the pressure gage 9. The first floating plug 11 is arranged in the vicinity of the die in the interior of the melt 7. After passing through the vacuum container 1, the melt 7, which has then already solidified to form the finished pipe, enters the vacuum container 2, the reduced pressure of which is displayed on the pressure gage 9' and which likewise contains sizing plates 8' to support the pipe, and the melt is cooled further there. After emerging from the vacuum container 2, the second floating plug 12 is arranged in the region of the cutting-to-length device 14. The supply and discharge of cooling water, according to the invention, for the interior of the pipe can be carried out effectively by means of the bayonet closures 15.

I claim:

1. A process of producing large-bore thick-walled polyethylene pipes comprising the steps of:

extruding polyethylene melt from an annular extrusion die to form a pipe, cooling the pipe emerging from the die by applying water to the inside and outside thereof, placing spaced apart first and second floating plugs inside the pipe for holding water in the space between the plugs, the external diameter of each floating plug corresponding to the internal diameter of the pipe being produced, fixing each of the floating plugs to the annular extrusion die by retaining elements, locating the first floating plug close to the extrusion die and locating the second floating plug a greater distance from the extrusion die close to the where pipe is cut to length, and equipping the second floating plug with quick bayonet closures for supplying and discharging cooling water into and away from the interior of the pipe being produced, providing a plurality of sets of water supply and discharge lines for said supplying and discharging of said cooling water, and detaching and replacing an active set of supply and discharge lines by a subsequent set of said supply and discharge lines in each case after a pipe section has been cut to length.

2. The process as claimed in claim 1, wherein water is introduced into the space between the two floating plugs in an amount which fills the volume of the space to a level of 0.1 to 40%.

3. The process as claimed in claim 2, wherein the water fills the volume of the space to a level of 0.2 to 30%.

4. The process as claimed in claim 2, wherein the water fills the volume of the space to a level of 0.3 to 25%.

5. The process as claimed in claim 1, wherein the second floating plug is equipped, additionally, with an excess pressure safety valve.

\* \* \* \* \*